US012630453B2

(12) United States Patent
He et al.

(10) Patent No.: US 12,630,453 B2
(45) Date of Patent: May 19, 2026

(54) RESOURCE-ORIENTED UTILIZATION METHOD FOR HIGH-SALT SALT MUD CONTAINING SODIUM CHLORIDE AND SODIUM SULFATE

(71) Applicant: DONGJIANG ENVIRONMENTAL COMPANY LIMITED, Shenzhen (CN)

(72) Inventors: Long He, Shenzhen (CN); Wenbin Xu, Shenzhen (CN); Yanhua Zhang, Shenzhen (CN); Kai Zhou, Shenzhen (CN); Xinglin Guo, Shenzhen (CN)

(73) Assignee: DONGJIANG ENVIROMENTAL COMPANY LIMITED, Shenzhen (CN)

( * ) Notice: Subject to any disclaimer, the term of this patent is extended or adjusted under 35 U.S.C. 154(b) by 497 days.

(21) Appl. No.: 18/020,371

(22) PCT Filed: Apr. 6, 2021

(86) PCT No.: PCT/CN2021/085560
§ 371 (c)(1),
(2) Date: Feb. 8, 2023

(87) PCT Pub. No.: WO2022/083074
PCT Pub. Date: Apr. 28, 2022

(65) Prior Publication Data
US 2023/0264996 A1     Aug. 24, 2023

(30) Foreign Application Priority Data

Oct. 20, 2020    (CN) .......................... 202011120821.0

(51) Int. Cl.
*C02F 9/00* (2023.01)
*C01D 7/26* (2006.01)
(Continued)

(52) U.S. Cl.
CPC .................. *C02F 9/00* (2013.01); *C01D 7/26* (2013.01); *C05C 3/00* (2013.01); *C02F 1/001* (2013.01);
(Continued)

(58) Field of Classification Search
CPC .......... C02F 9/00; C02F 1/001; C02F 1/5236; C02F 1/66; C02F 1/722; C02F 1/76;
(Continued)

(56) References Cited

U.S. PATENT DOCUMENTS 6,143,182 A    11/2000 Huang et al.

FOREIGN PATENT DOCUMENTS

CN    101837995 A    9/2010
CN    103449653 A    12/2013
(Continued)

OTHER PUBLICATIONS

Translation of CN_109824183 (Year: 2019).*

*Primary Examiner* — Daniel Berns
*Assistant Examiner* — Joshua Maxwell Speer

(57)    ABSTRACT

The present disclosure relates to the field of resource-oriented utilization technologies for wastewater salt muds and more particular to a resource-oriented utilization method for a high-salt salt mud containing sodium chloride and sodium sulfate. The method includes: performing two stages of oxidation, i.e. Fenton-like treatment and chlorine dioxide treatment, in sequence on a salt mud solution, and then replacing a sodium salt with an ammonium salt to prepare a pure alkali and a mixed ammonium salt. In the method, multi-stage oxidation process is performed to effectively use ingredients such as sodium chloride and sodium sulfate so as to thoroughly eliminate organic matters and heavy metals in the high-salt salt mud, and achieve resource-oriented utilization of the salt mud, thus saving burial treatment costs, and (Continued)

producing good economic benefits as well as good environmental benefits.

10 Claims, 1 Drawing Sheet

(51) Int. Cl.

| | | |
|---|---|---|
| *C02F 1/00* | (2023.01) | |
| *C02F 1/52* | (2023.01) | |
| *C02F 1/66* | (2023.01) | |
| *C02F 1/72* | (2023.01) | |
| *C02F 1/76* | (2023.01) | |
| *C02F 101/10* | (2006.01) | |
| *C02F 101/12* | (2006.01) | |
| *C02F 101/20* | (2006.01) | |
| *C05C 3/00* | (2006.01) | |

(52) U.S. Cl.

CPC .............. *C02F 1/5236* (2013.01); *C02F 1/66* (2013.01); *C02F 1/722* (2013.01); *C02F 1/76* (2013.01); *C02F 2101/101* (2013.01); *C02F 2101/12* (2013.01); *C02F 2101/20* (2013.01); *C02F 2305/026* (2013.01)

(58) Field of Classification Search

CPC ............ C02F 2101/101; C02F 2101/12; C02F 2101/20; C02F 2305/026; C02F 1/004; C02F 1/48; C02F 1/725; C02F 2101/206; C02F 2101/22; C02F 2303/18; C02F 2305/08; C01D 7/26; C01D 7/00; C05C 3/00; C01G 49/02; Y02P 20/584

See application file for complete search history.

(56) References Cited

FOREIGN PATENT DOCUMENTS

| | | | |
|---|---|---|---|
| CN | 103508607 A | | 1/2014 |
| CN | 104591453 A | | 5/2015 |
| CN | 104692576 A | | 6/2015 |
| CN | 105016362 A | | 11/2015 |
| CN | 106430778 A | | 2/2017 |
| CN | 109824183 A | * | 5/2019 |
| CN | 112225234 A | | 1/2021 |
| JP | 61197093 A | | 9/1986 |

* cited by examiner

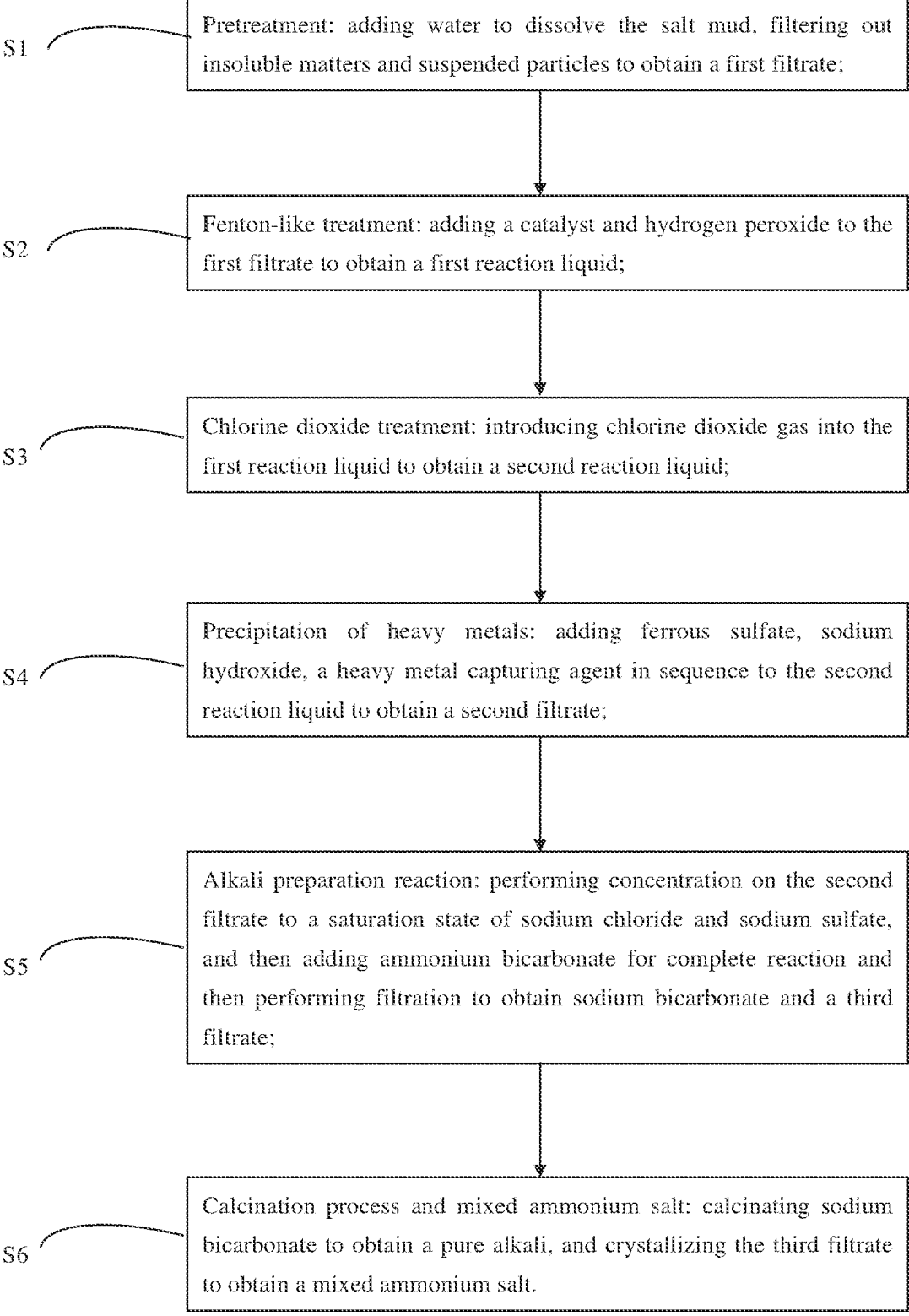

S1　　Pretreatment: adding water to dissolve the salt mud, filtering out insoluble matters and suspended particles to obtain a first filtrate;

S2　　Fenton-like treatment: adding a catalyst and hydrogen peroxide to the first filtrate to obtain a first reaction liquid;

S3　　Chlorine dioxide treatment: introducing chlorine dioxide gas into the first reaction liquid to obtain a second reaction liquid;

S4　　Precipitation of heavy metals: adding ferrous sulfate, sodium hydroxide, a heavy metal capturing agent in sequence to the second reaction liquid to obtain a second filtrate;

S5　　Alkali preparation reaction: performing concentration on the second filtrate to a saturation state of sodium chloride and sodium sulfate, and then adding ammonium bicarbonate for complete reaction and then performing filtration to obtain sodium bicarbonate and a third filtrate;

S6　　Calcination process and mixed ammonium salt: calcinating sodium bicarbonate to obtain a pure alkali, and crystallizing the third filtrate to obtain a mixed ammonium salt.

RESOURCE-ORIENTED UTILIZATION METHOD FOR HIGH-SALT SALT MUD CONTAINING SODIUM CHLORIDE AND SODIUM SULFATE

CROSS-REFERENCE TO RELATED APPLICATIONS

This Application is a national stage application of PCT/ CN2021/085560. This application claims priorities from PCT Application No. PCT/CN2021/085560, filed Apr. 6, 2021, and from the Chinese patent application 202011120821.0 filed Oct. 20, 2020, the content of which are incorporated herein in the entirety by reference.

TECHNICAL FIELD

The present disclosure relates to the field of resource-oriented utilization technologies for wastewater salt muds, and more particularly to a resource-oriented utilization method for a high-salt salt mud containing sodium chloride and sodium sulfate.

BACKGROUND

Contemporarily, because upstream waste producers fail to perform proficient separation and distribution, difficult-to-degrade wastewater containing a high Chemical Oxygen Demand (COD), high ammonia nitrogen, high salts, and heavy metals is produced, where there are usually three or more types of salts therein. After such wastewater is physico-chemically treated by a hazardous waste treatment enterprise, a large quantity of salt mud is produced. Such salt mud mainly contains sodium chloride and sodium sulfate, and some salt mud usually contains a small amount of nitrate, potassium salt, and ammonium salt. Further, the salt mud contains difficult-to-degrade organic matter and heavy metals such as copper, iron, nickel, tin, chromium, and the like.

The above solution has the following shortcomings: in the prior art, such salt mud is mostly transported to a qualified hazardous waste safety landfill site for solidification and stabilization and then buried. But, after the burial treatment, some of the salts may return to a system along with a leachate, and thus the salts are not effectively treated. At present, there is no sufficient technology for treating the salt mud produced by a waste liquid containing high salt and a high COD. Therefore, improvement is to be made.

SUMMARY

To solve the shortcomings in the prior art, the present disclosure provides a resource-oriented utilization method for a high-salt salt mud containing sodium chloride and sodium sulfate, in which a multi-stage oxidation process is performed to effectively use ingredients such as sodium chloride and sodium sulfate to thoroughly eliminate organic matters and heavy metals in the high-salt salt mud and achieve resource-oriented utilization of the salt mud, thus saving burial treatment costs, and resulting in economic and environmental benefits.

The above technical object of the present disclosure is achieved in the following technical scheme: there is provided a resource-oriented utilization method for a high-salt salt mud containing sodium chloride and sodium sulfate, including: performing two stages of oxidation, i.e. Fenton-like treatment and chlorine dioxide treatment, in sequence on a salt mud solution, and then replacing a sodium salt with an ammonium salt to prepare a pure alkali and a mixed ammonium salt.

Preferably, the method further includes:

at step S1, pretreatment: adding water to dissolve the salt mud, filtering out insoluble matters and suspended particles to obtain a first filtrate;

at step S2, Fenton-like treatment: adding a catalyst and hydrogen peroxide to the first filtrate to obtain a first reaction liquid;

at step S3, chlorine dioxide treatment: introducing chlorine dioxide gas into the first reaction liquid to obtain a second reaction liquid;

at step S4, precipitation of heavy metals: adding ferrous sulfate, sodium hydroxide, and a heavy metal capturing agent in sequence to the second reaction liquid to obtain a second filtrate;

at step S5, alkali preparation reaction: performing concentration on the second filtrate to a saturation state of sodium chloride and sodium sulfate, and then adding ammonium bicarbonate for complete reaction and then performing filtration to obtain sodium bicarbonate and a third filtrate;

at step S6, calcination process and mixed ammonium salt: calcinating sodium bicarbonate to obtain a pure alkali, and crystallizing the third filtrate to obtain a mixed ammonium salt.

According to a principle of the present disclosure, the salt mud is dissolved in a sufficient amount of water to obtain the first filtrate; and a chemical oxygen demand (COD) and a heavy metal content of the first filtrate both are higher. Thus, oxidation treatment is performed for the first filtrate by using Fenton-like treatment and hydroxyl free radicals in the Fenton-like oxidation decompose, through oxidation, macromolecular organic matter and heavy metal complexes in the salt mud into micromolecular organic matter, carbon dioxide and water to obtain the first reaction liquid; then, oxidation treatment is performed again for the first reaction liquid by using chlorine dioxide such that remaining micromolecular organic matters are further oxidized by using strong oxidation of chlorine dioxide, to realize effective decomposition on mud slags produced by the Fenton-like treatment. The purpose of adding ferrous sulfate, sodium hydroxide, and a heavy metal capturing agent to the second reaction liquid is to enable heavy metal ions and an iron salt in the second filtrate to generate a stable ferrite co-precipitate by controlling conditions such as pH value and temperature and then use a solid-liquid separation means to achieve removal of heavy metal ions. The purpose of adding the heavy metal capturing agent is that the heavy metal capturing agent can, at normal temperature and in a wide pH value range, chemically react with various heavy metal ions such as $Cu^{2+}$, $Cd^{2+}$, $Hg^{2+}$, $Pb^{2+}$, $Mn^{2+}$, $Ni^{2+}$, $Zn^{2+}$, $Cr^{3+}$ in the second reaction liquid and quickly generate insoluble flocculent precipitate which is low in water content and easy to filter out within a short period, thus effectively removing heavy metal elements in the second reaction liquid. When sodium chloride and sodium sulfate reach a saturation state, ammonium bicarbonate is added to the second filtrate to replace $Na^+$ with $NH^{4+}$ to prepare an ammonium salt solution, i.e. the third filtrate and sodium bicarbonate. Under high temperatures, sodium bicarbonate is decomposed into sodium carbonate, volatile carbon dioxide, and water vapor to prepare a pure alkali, and the ammonium salt in the third filtrate undergoes evaporation concentration and cooling crystallization to yield a mixed ammonium salt which mainly includes ammonium chloride, ammonium sulfate, ammonium bisulfate, ammonium nitrate, ammonium carbonate, and ammonium bicarbonate, and a remaining mother liquid can be recycled for dissolution of new salt mud.

Preferably, the catalyst in the step S2 is ferroferric oxide, which is recycled after standing separation under a magnetic field condition following a complete Fenton-like reaction, and a magnetization intensity in the magnetic field condition is 50 to 90 Oersted (Oe).

Furthermore, preferably, ferroferric oxide is one or more of a spherical powder, a regular octahedral powder, and a cubic monocrystal powder, with a particle size of 30 to 50 nm.

Furthermore, preferably, the step S2 includes: adjusting the pH of the first filtrate to 2 to 6, adding ferroferric oxide and hydrogen peroxide to the first filtrate, and stirring the mixture at a stirring speed of 300-1000 r/min under a temperature of 10-50° C. for 0.5-1 h, where a mass ratio of ferroferric oxide to the salt mud is 2 to 6.4:100, and a mass ratio of hydrogen peroxide to the salt mud is 1.2 to 4.8:100.

Its purpose is as follows: in the Fenton oxidation method, under an acid condition, hydrogen peroxide can generate hydroxyl free radicals (OH) with strong oxidation in the presence of $Fe^{2+}$, and produce other active oxygens to achieve decomposition on organic matters, where the oxidation process is a chain reaction. With generation of ·OH as a start of the chain, other active oxygen and reaction intermediates form nodes of the chain. When various active oxygens are consumed, the reaction chain is terminated. The reaction mechanism is complex. These active oxygens are provided only to organic molecules which are thus mineralized to inorganic matters such as $CO_2$ and $H_2O$. In the present disclosure, based on the Fenton-like oxidation method, the pH condition and the masses of the hydrogen peroxide and ferroferric oxide are defined to facilitate the implementation of the object of the present disclosure.

Preferably, the step S3 includes: adjusting a pH of the first reaction liquid to 6 to 10 and introducing chlorine dioxide gas with a concentration of 10-40 mg/L under room temperature for 0.5 to 2 h.

Its purpose is as follows: due to the strong oxidation of chlorine dioxide, the reactions of chlorine dioxide and organic matter are all free radical oxygen reactions. Most of the organic matter with a high boiling point is oxidized to organic matter of small and medium-sized molecules with a low boiling point, where some organic matter therein is decomposed to a volatile organic matter, $CO_2$ and $H_2O$.

Preferably, the step S4 includes: adding ferrous sulfate to the second reaction liquid, adding sodium hydroxide to the second reaction liquid to adjust a pH to 10 to 11 until heavy metals are completely precipitated, and then adding the heavy metal capturing agent, wherein a mass ratio of the heavy metal capturing agent to the salt mud is 1 to 5:100, and a mass ratio of the ferrous sulfate to the salt mud is 0.5 to 5:100.

Its purpose is as follows: based on a ferrite method, heavy metals are processed using a heavy metal capturing agent, and $SO_4^{2-}$ introduced by ferrous sulfate reacts with the ammonium salt to generate ammonium sulfate which can be directly applied. The pH condition and the masses of ferrous sulfate and the heavy metal capturing agent are defined to prevent incomplete reaction resulting from insufficient substances or unnecessary wastes resulting from excessive substances, thus avoiding affecting the quality of the finished products.

Preferably, the heavy metal capturing agent is applicable to the capture of heavy metals in an alkaline wastewater.

Preferably, the step S5 includes: performing concentration on the second filtrate until sodium chloride and sodium sulfate reach a dissolution saturation state, and then adding ammonium bicarbonate and then stirring at a speed of 300 to 1000 r/min under a temperature of 30° C. to 50° C. for 1-1.5 h, where a mass ratio of the ammonium bicarbonate to the salt mud is 1.1 to 1.9:1. By controlling a mass and a reaction condition for replacing the sodium salt by the ammonium salt, a replacement of maximum efficiency can be achieved.

Preferably, the sodium bicarbonate is calcinated at a temperature of 200 to 240° C. for a calcination time of 30 to 35 min.

In conclusion, the present disclosure has the following beneficial effects.

Firstly, hydroxyl free radicals in the Fenton-like oxidation decompose, through oxidation, macromolecular organic matter and heavy metal complexes in the salt mud into micromolecular organic matter, carbon dioxide, and water, and then the remaining micromolecular organic matter is further oxidized by using strong oxidation of chlorine dioxide. Compared with the salt mud treated by Fenton oxidation, fewer mud slags are produced.

Secondly, in the Fenton-like oxidation of the present disclosure, ferroferric oxide is used as a catalyst which can be easily separated under a magnetic field, thus solving the problem that the catalyst is difficult to separate.

Thirdly, in the present disclosure, the sodium salt is replaced with the ammonium salt to obtain a mixed ammonium salt which can be used for the production of a fertilizer without going through complex separation.

BRIEF DESCRIPTIONS OF THE DRAWINGS

To clearly describe the technical schemes in the present disclosure, the following drawing is provided.

FIG. 1 is a flowchart illustrating a resource-oriented utilization method for a high-salt salt mud containing sodium chloride and sodium sulfate.

DETAILED DESCRIPTIONS OF EMBODIMENTS

Detailed descriptions are made to the present disclosure in combination with the specific embodiments. It should be pointed out that the following embodiments are intended to facilitate understanding the present disclosure rather than limit the present disclosure. Unless otherwise stated, all technical and scientific terms used herein have the same meanings as those skilled in the art can generally understand. If conflicting, the definitions of the specification shall prevail.

The term "prepared with . . . " used herein has the same meaning as "containing". The terms "containing", "including", "having" and "comprising" or any variation thereof used herein are intended to cover non-exclusive inclusion. For example, a composition, process, method, product, or apparatus including the listed elements are not necessarily limited to those elements but may include other unlisted elements or elements inherent to the composition, process, method, product, or apparatus.

The term "consisting of" excludes any un-indicated elements, steps, or components. If used in the claims, the phrase will enable the claims to be of a closed type such that the claims do not include those materials other than the described materials, except for common impurities related to them. When the phrase "consisting of" appears in a sub-sentence of a body of the claims rather than closely follows the subject, it only defines the elements described in the sub-sentence; and other elements are not excluded from the entire claims.

When equivalents, concentrations, or other values or parameters are represented by using a range, a preferred range, or a range defined by a series of upper-limit preferred values and lower-limit preferred values, it should be understood that all ranges formed by any pair of an upper limit or preferred value of any range and a lower limit or preferred value of any range are specifically disclosed, regardless of whether the ranges are disclosed separately. For example, when a disclosed range is "1 to 5", the described range should be interpreted as including the ranges of "1 to 4", "1 to 3", "1 to 2", "1 to 2 and 4 to 5", and "1 to 3 and 5" and the like. When a numerical range is described in the specification, the numerical range is intended to include its end values and all integers and fractions in the range.

Embodiment 1

200 kg of brown salt mud separated from a physico-chemically-treated wastewater mother liquid was obtained and the production was carried out in the following steps.

(1) 200 kg of salt mud was dissolved in 600 kg of water and then insoluble matters and suspended particles were filtered out to obtain a first filtrate.

(2) The first filtrate was adjusted to pH 2, and then 8 kg of hydrogen peroxide solution (i.e. 2.4 kg of hydrogen peroxide) with a concentration of 30% and 4 kg of ferro-ferric oxide of spherical powder were added while the first filtrate was stirred at a stirring speed of 300 r/min under a temperature of 50° C.; after one hour of stirring, the first filtrate was placed in a magnetic condition with an intensity of 70 Oersted (Oe) and then stood and filtered to obtain ferroferric oxide to obtain a first reaction liquid, where the separated ferroferric oxide was collected for recycling.

(3) The first reaction liquid was adjusted to pH 6 and stirred continuously, and chlorine dioxide gas with a concentration of 10 mg/L was introduced to the first reaction liquid under room temperature and stirred for 0.5 h to obtain a second reaction liquid.

(4) The second reaction liquid was continuously stirred, to which 1 kg of ferrous sulfate was added and then sodium hydroxide with a mass fraction of 30% was added to adjust pH to 11 until heavy metal elements were completely precipitated, and then 2 kg of solid powdered metal capturing agent applicable to an alkaline wastewater was added to obtain a second filtrate by filtration.

(5) With the adjusted temperature of 30° C. and a stirring speed of 300 r/min, the second filtrate was concentrated until sodium chloride and sodium sulfate reached a dissolution saturation state, and then 220 kg of ammonium bicarbonate was added and stirred for 1 h and then suction-filtered to separate sodium bicarbonate and a third filtrate.

(6) Sodium bicarbonate was calcinated at a temperature of 200° C. for 30 min, to obtain a pure alkali, and the third filtrate was subjected to evaporation concentration and cooling crystallization with an evaporation water amount being 30% of the volume of the third filtrate and a cooling temperature being 20° C., to obtain a mixed ammonium salt by separation, where the filtrate was collected as a mother liquid to be mixed with a new salt mud for dissolution.

Embodiment 2

The present embodiment differs from embodiment 1 in that: in the full production process, the stirring speed was 1000 r/min; the mass of water in step (1) was 800 kg; in step (2), the first filtrate was adjusted to pH 6, the temperature was 10° C., and 16 kg of hydrogen peroxide solution of 30% (i.e. 4.8 kg of hydrogen peroxide) and 12.8 kg of cubic monocrystal powdered ferroferric oxide were added; in step (3), the first reaction liquid was adjusted to pH 10, the concentration of chlorine dioxide gas was 30 mg/L, and stirring lasts for 1 h; in step (4), the mass of ferrous sulfate was 10 kg, sodium hydroxide was added to adjust pH to 10, and the mass of the heavy metal capturing agent was 10 kg; in step (5), the mass of ammonium bicarbonate was 380 kg; in step (6), the calcination time was 35 min.

Preferred Embodiment

The present embodiment differs from embodiment 1 in that: in step (1), the mass of water was 1000 kg; in step (2), the first filtrate was adjusted to pH 4, and 32 kg of hydrogen peroxide solution of 30% (i.e. 9.6 kg of hydrogen peroxide) and 4.9 kg of ferroferric oxide were added; in step (3), the first reaction liquid was adjusted to pH 10, the concentration of chlorine dioxide gas was 40 mg/L and stirring lasts for 2 h; in step (4), the mass of ferrous sulfate was 5 kg, the mass of the heavy metal capturing agent was 5 kg; in step (5), the mass of ammonium bicarbonate was 300 kg, and stirring lasts for 1.5 h and then filtration was performed; in step (6), the calcination temperature was 240 degrees Celsius, with the evaporation water amount being 45% of the volume of the third filtrate.

The major raw material use amounts or concentrations of embodiments 1 and 2 and a preferred embodiment of the present disclosure are shown in the following table.

| Used materials | Embodiment 1 | Embodiment 2 | Preferred Embodiment |
|---|---|---|---|
| Salt mud | 200 kg | 200 kg | 200 kg |
| Water | 700 kg | 800 kg | 1000 kg |
| Hydrogen peroxide | 2.4 kg | 4.8 kg | 9.6 kg |
| Ferroferric oxide | 4 kg | 12.8 kg | 4.9 kg |
| Concentration of chlorine dioxide | 10 mg/L | 30 mg/L | 40 mg/L |
| Ferrous sulfate | 1 kg | 10 kg | 5 kg |
| Metal capturing agent | 2 kg | 10 kg | 5 kg |
| Ammonium bicarbonate | 220 kg | 380 kg | 300 kg |

In embodiments 1 and 2 and the preferred embodiment of the present disclosure, the content of the insoluble matter in the salt mud is 2%, the content of the organic matter is 10%, the content of sodium chloride is 72%, and the content of sodium sulfate is 10%.

The purities of the finished products obtained in embodiments 1 and 2 and the preferred embodiment of the present disclosure are shown in the following table.

| Detection results | Embodiment 1 | Embodiment 2 | Preferred Embodiment |
|---|---|---|---|
| Removal rate of organic matters % | 98.2 | 98.5 | 98.8 |
| Sodium content in mixed ammonium salt % | 2.3 | 2.3 | 1.5 |
| Purity of pure alkaline % | 98.7 | 98.3 | 98.9 |
| Removal rate of heavy metals % | 99.0 | 99.4 | 99.3 |
| Recovery rate of salt mud | 90.4 | 94.2 | 95.5 |

It can be seen from the above table that the recovery rate of the salt mud in the present disclosure is above 90%, and the removal rate of the organic matter in the salt mud treated with Fenton-like treatment and chlorine dioxide treatment is above 98%, the content of sodium in the prepared mixed ammonium salt is 1.5% to 2.5%, and the purity of the prepared pure alkali is above 98%, and the removal rate of heavy metals is above 99%, which measures up to the National Standard GB210.12004.

In the above embodiments, the salt mud is separated from a wastewater mother liquid and the present disclosure is not limited hereto. The salt mud adopted includes a salt mud produced by performing the physico-chemical treatment in the hazardous waste industry, a salt mud produced in the coal chemical industry, and a salt mud produced by leachates of the waste landfill sites. Such salt mud mainly contains sodium chloride and sodium sulfate and may contain a small amount of nitrate, potassium salt, and ammonium salt. Further, the salt mud may contain some organic matter and heavy metals such as copper, iron, nickel, tin, chromium, and the like. These salt muds can all be treated for resource utilization based on the method.

According to a principle of the present disclosure, the salt mud is dissolved in water to obtain the first filtrate; and a chemical oxygen demand (COD) and a heavy metal content of the first filtrate both are higher. Thus, oxidation treatment is performed for the first filtrate by using Fenton-like treatment and hydroxyl free radicals in the Fenton-like oxidation decompose, through oxidation, macromolecular organic matter and heavy metal complexes in the salt mud into micromolecular organic matter, carbon dioxide and water to obtain the first reaction liquid; then, oxidation treatment is performed again for the first reaction liquid by using chlorine dioxide such that remaining micromolecular organic matters are further oxidized by using strong oxidation of chlorine dioxide, to realize effective decomposition on mud slags produced by the Fenton-like treatment. The purpose of adding ferrous sulfate, sodium hydroxide, and a heavy metal capturing agent to the second reaction liquid is to enable heavy metal ions and an iron salt in the second filtrate to generate a stable ferrite co-precipitate by controlling conditions such as pH value and temperature and then use a solid-liquid separation means to achieve removal of heavy metal ions. The purpose of adding the heavy metal capturing agent is that the heavy metal capturing agent can, at normal temperature and in a wide pH value range, chemically react with various heavy metal ions such as $Cu^{2+}$, $Cd^{2+}$, $Hg^{2+}$, $Pb^{2+}$, $Mn^{2+}$, $Ni^{2+}$, $Zn^{2+}$, $Cr^{3+}$ in the second reaction liquid and quickly generate insoluble flocculent precipitate which is low in water content and easy to filter out within a short period, thus effectively removing heavy metal elements in the second reaction liquid. When sodium chloride and sodium sulfate reach saturation state, ammonium bicarbonate is added to the second filtrate to replace $Na^+$ with $NH^{4+}$, to prepare an ammonium salt solution, i.e. the third filtrate and sodium bicarbonate. Under high temperatures, sodium bicarbonate is decomposed into sodium carbonate, volatile carbon dioxide, and water vapor to prepare a pure alkali, and the ammonium salt in the third filtrate undergoes evaporation concentration and cooling crystallization to yield a mixed ammonium salt which mainly includes ammonium chloride, ammonium sulfate, ammonium bisulfate, ammonium nitrate, ammonium carbonate, and ammonium bicarbonate, and a remaining mother liquid can be recycled for dissolution of new salt mud.

The above embodiments are illustrative and used only to explain some features of the method of the present disclosure. The appended claims are aimed to require a possibly wide scope that can be conceived of, and the embodiments presented herein are demonstrated by the true test results of the applicant. Therefore, the applicant desires that the appended claims are not limited by a selection of embodiments of the features of the present disclosure. Some numerical ranges used in the appended claims include subranges therein and the changes in these subranges shall be, in possible cases, interpreted as covered by the appended claims.

What is claimed is:

1. A resource-oriented utilization method for a salt mud containing sodium chloride and sodium sulfate, comprising step S1, pretreatment to obtain a first filtrate and step S2 and step S3: performing two stages of oxidation comprising a Fenton-like treatment of adding a catalyst and hydrogen peroxide to the first filtrate to obtain a first reaction liquid and a chlorine dioxide treatment, in sequence on a salt mud solution, and then replacing a sodium salt with an ammonium salt to prepare an alkali and a mixed ammonium salt, wherein the catalyst is ferroferric oxide which is recycled after standing separation under a magnetic field condition following complete Fenton-like reaction.

2. The method of claim 1, further comprising:
   at the step S1, the pretreatment: adding water to dissolve the salt mud, filtering out the insoluble matters and the suspended particles to obtain the first filtrate;
   at the step S2, the Fenton-like treatment: adding a catalyst and hydrogen peroxide to the first filtrate to obtain the first reaction liquid;
   at the step S3, chlorine dioxide treatment: introducing chlorine dioxide gas into the first reaction liquid to obtain a second reaction liquid;
   at step S4, precipitation of metals: adding ferrous sulfate, sodium hydroxide, and a metal capturing agent in sequence to the second reaction liquid to obtain a second filtrate;
   at step S5, alkali preparation reaction: performing concentration on the second filtrate to a saturation state of sodium chloride and sodium sulfate, and then adding ammonium bicarbonate for complete reaction and then performing filtration to obtain sodium bicarbonate and a third filtrate; and
   at step S6, calcination process and mixed ammonium salt: calcinating sodium bicarbonate to obtain the alkali, and crystallizing the third filtrate to obtain a mixed ammonium salt.

3. The method of claim 1, wherein ferroferric oxide is one or more of a spherical powder, a regular octahedral powder and a cubic monocrystal powder, with a particle size of 30 to 50 nm.

4. The method of claim 1, wherein the step S2 comprises: adjusting a pH of the first filtrate to 2 to 6, adding ferroferric oxide and hydrogen peroxide to the first filtrate, and stirring the mixture at a stirring speed of 300-1000 r/min under a temperature of 10-50° C. for reaction of 0.5-1 h, wherein a mass ratio of ferroferric oxide to the salt mud is 2 to 6.4:100, and a mass ratio of hydrogen peroxide to the salt mud is 1.2 to 4.8:100.

5. The method of claim 2, wherein the step S3 comprises: adjusting a pH of the first reaction liquid to 6 to 10, and introducing chlorine dioxide gas with a concentration of 10-40 mg/L under room temperature for reaction of 0.5 to 2 h.

6. The method of claim 2, wherein the step S4 comprises: adding ferrous sulfate to the second reaction liquid, and adding sodium hydroxide to the second reaction liquid to adjust a pH to 10 to 11 until the metals are completely precipitated, and then adding the metal capturing agent, wherein a mass ratio of the metal capturing agent to the salt mud is 1 to 5:100, and a mass ratio of the ferrous sulfate to the salt mud is 0.5 to 5:100.

7. The method of claim 2, wherein the metal capturing agent is applicable to capture of the metals in an alkaline wastewater.

8. The method of claim 2, wherein the step S5 comprises: performing concentration on the second filtrate until sodium chloride and sodium sulfate reach a dissolution saturation state, and then adding ammonium bicarbonate and then stirring at a speed of 300 to 1000 r/min under a temperature of 30° C. to 50° C. for reaction of 1-1.5 h, wherein a mass ratio of the ammonium bicarbonate to the salt mud is 1.1 to 1.9:1.

9. The method of claim 2, wherein the sodium bicarbonate is calcinated at a temperature of 200 to 240° C. for a calcination time of 30 to 35 min.

10. The method of claim 6, wherein the metal capturing agent is applicable to capture of the metals in the alkaline wastewater.

\* \* \* \* \*